US007596496B2

(12) United States Patent
Jabloun

(10) Patent No.: US 7,596,496 B2
(45) Date of Patent: Sep. 29, 2009

(54) VOICE ACTIVITY DETECTION APPARATUS AND METHOD

(75) Inventor: Firas Jabloun, Cambridge (GB)

(73) Assignee: Kabuhsiki Kaisha Toshiba, Tokyo (JP)

( * ) Notice: Subject to any disclaimer, the term of this patent is extended or adjusted under 35 U.S.C. 154(b) by 225 days.

(21) Appl. No.: 11/429,308

(22) Filed: May 8, 2006

(65) Prior Publication Data

US 2006/0253283 A1 Nov. 9, 2006

(30) Foreign Application Priority Data

May 9, 2005 (GB) ................................ 0509415.6

(51) Int. Cl.
*G10L 15/20* (2006.01)
*G10L 21/02* (2006.01)
*G10L 15/00* (2006.01)

(52) U.S. Cl. ........................ 704/233; 704/226; 704/240

(58) Field of Classification Search ....................... None
See application file for complete search history.

(56) References Cited

U.S. PATENT DOCUMENTS

| | | | | |
|---|---|---|---|---|
| 6,154,721 A | 11/2000 | Sonnic | | |
| 6,349,278 B1 * | 2/2002 | Krasny et al. | ............... | 704/233 |
| 2004/0064314 A1 * | 4/2004 | Aubert et al. | ............... | 704/233 |
| 2004/0122667 A1 | 6/2004 | Lee et al. | | |
| 2005/0038651 A1 | 2/2005 | Zhang et al. | | |
| 2005/0131689 A1 * | 6/2005 | Garner et al. | ............... | 704/240 |

FOREIGN PATENT DOCUMENTS

| | | |
|---|---|---|
| JP | 2005-249816 | 9/2005 |
| WO | WO 01/11606 A1 | 2/2001 |

OTHER PUBLICATIONS

Sohn er al., "A voice activity detector employing soft decision based noise spectrum adaptation", ICASSP '98, Seattle, WA, USA, Dec. 1, 1998, pp. 365-368, vo1.1.*

Jongseo Sohn, et al., "A statistical Model-Based Voice Activity Detection", IEEE Signal Processing Letters, vol. 6, No. 1, Jan. 1999, pp. 1-3.

Yong Duk Cho, et al., "Improved Voice Activity Detection based on a Smoothed Statistical Likelihood Ratio", Proceedings of ICASSP, Salt Lake City, USA, vol. 2, May 2001, pp. 737-740.

Volker Stahl, et al., "Quantile Based Noise Estimation for Spectral Subtraction and Wiener Filtering", ICASSP 2000, vol. 3, 2000, pp. 1875-1878.

(Continued)

*Primary Examiner*—David R Hudspeth
*Assistant Examiner*—Brian L Albertalli
(74) *Attorney, Agent, or Firm*—Oblon, Spivak, McClelland, Maier & Neustadt, L.L.P.

(57) ABSTRACT

A voice activity detection method comprising the steps of (a) Estimating in a noise power estimator the noise power within a signal having a speech component and a noise component, and (b) Calculating a likelihood ratio for the presence of speech in the signal from the estimated power of noise signals from step (a) and a complex Gaussian statistical model.

16 Claims, 4 Drawing Sheets

OTHER PUBLICATIONS

Rainer Martin, "Noise Power Spectral Density Estimation Based on Optimal Smoothing and Minimum Statistics", IEEE Transactions on Speech and Audio Proccessing, vol. 9, No. 5, Jul. 2001, pp. 504-512.

Demuth, H., and Beale, M., "Neural Network Toolbox User's Guide V3.0", Mathworks, Jul. 1997 (Jul. 1997).

Moticek, Petr, et al., "Noise Estimation for Efficient Speech Inhancement and Robust Speech Recognition", ICSLP 2002: $7^{th}$ International Conference on Spoken Language Processing, Denver, Colorado, Sep. 16-20, 2002 [International Conference on Spoken Language Processing (ICSLP)], Adelaide, Australia: Casual Productions, Sep. 16, 2002, pp. 1033-1036.

* cited by examiner

VOICE ACTIVITY DETECTION APPARATUS AND METHOD

FIELD OF INVENTION

The present invention relates to signal processing and in particular a voice activity detection method and voice activity detector.

BACKGROUND OF INVENTION

Speech signals that are transmitted by speech communication devices will often be corrupted to some extent by noise which interferes with and degrades the performance of coding, detection and recognition algorithms.

A variety of different voice activity detectors and detection methods have been developed in order to detect speech periods in input signals which comprise both speech and noise components. Such devices and methods have application in areas such as speech coding, speech enhancement and speech recognition.

The simplest form of voice activity detection is an energy based method in which the power of an input signal is assessed in order to determine if speech is present (i.e. an increase in energy indicates the presence of speech). Such a technique works well where the signal to noise ratio is high but becomes increasingly unreliable in the presence of noisy signals.

A voice activity detection method based on the use of a statistical model is described in "A Statistical Model Based Voice Activity Detection" by Sohn et al [IEEE Signal Processing Letters Vol 6, No 1, January 1999]. The statistical model described uses a model for noise and speech to calculate a likelihood ratio (LR) statistic (where LR=[probability speech is present]/[probability speech is absent]). The LR statistic so calculated is then compared to a threshold value in order to decide whether the speech signal (or section thereof) under analysis contains speech.

The Sohn et al technique was modified in "Improved Voice Activity Detection Based on a Smoothed Statistical Likelihood Ratio" by Cho et al, In Proceedings of ICASSP, Salt Lake City, USA, vol. 2, pp 737-740, May 2001. The modified version of the technique proposes the use of a smoothed likelihood ratio (SLR) in order to alleviate detection errors that might otherwise be encountered at speech offset regions.

In order to calculate LR (or SLR) the above statistical methods both require the use of an existing noise power estimate. This noise estimate is obtained using the LR/SLR calculated during previous iterations of the analysis frames.

There thus exists a feedback mechanism within the above described statistical methods in which the likelihood ratio is calculated using an existing noise estimate which is in turn calculated using a previously derived likelihood ratio value. Such a feedback mechanism can result in an accumulation of errors which impacts upon the overall performance of the system.

As noted above the likelihood ratio that is calculated is compared to a threshold value in order to decide if speech is present. However, the likelihood ratios calculated in the above techniques can vary over the order of 60 dB or more. If there are large variations in the noise in the input signal then the threshold value may become an inaccurate indicator of the presence of speech and system performance may decrease.

It is therefore an object of the present invention to provide a voice activity detection method and apparatus that substantially overcomes or mitigates the above mentioned problems with the prior art.

BRIEF SUMMARY OF THE INVENTION

According to a first aspect of the present invention there is provided a voice activity detection method comprising the steps of (a) Estimating in a noise power estimator the noise power within a signal having a speech component and a noise component (b) Calculating a likelihood ratio for the presence of speech in the signal from the estimated power of noise signals from step (a) and a complex Gaussian statistical model.

The present invention proposes a voice activity detection method based on a statistical model wherein an independent noise estimation component is used to provide the model with a noise estimate. Since the noise estimation is now independent of the calculation of the likelihood ratio there is no longer a feedback loop between the noise estimation and the LR calculation.

The noise estimation may be conveniently performed by a quantile based noise estimation method (see for example "Quantile Based Noise Estimation for Spectral Subtration and Wiener Filtering" by Stahl, Fischer and Bippus, pp 1875-1878, vol. 3, ICASSP 2000; see also "Noise Power Spectral Density Estimation Based on Optimal Smoothing and Minimum Statistics", by Martin in IEEE Trans. Speech and Audio Processing, Vol. 9, No. 5, July 2001, pp. 504-512). However, any suitable noise estimation technique may be used.

Preferably the noise estimation value is further processed by smoothing the estimated value by a first order recursive function.

Conventional quantile based noise estimation methods require that a signal is analysed over K+1 frequency bands and T time frames for each time frame. This can be computationally expensive and so conveniently only a subset of the K+1 frequencies may be updated at any one time frame. The noise estimate at the remaining frequencies may be derived by interpolation from those values that have been updated.

It is noted that the threshold value against which the presence of speech is assessed is crucial to the overall performance of a voice activity detector. As noted above the calculated likelihood ratio can actually vary over many dBs and so preferably the parameter should be set such that it is robust to changes in the input speech dynamic range and/or the noise conditions.

Conveniently the calculated likelihood ratio can be restricted/compressed using a non-linear function to a predetermined interval (e.g. between zero and one). By compressing the likelihood ratio in this way the effects of variations in the SNR are mitigated against and the performance of the voice detector is improved.

Conveniently the likelihood ratio may be restricted to the range zero-to-one by the following function $\Psi(t)=1-\min(1,e^{-\Psi(t)})$ where $\Psi(t)$ is the smoothed likelihood ratio for frame t.

According to a second aspect of the present invention there is provided a voice activity detection method comprising the steps of (a) estimating the noise power within a signal having a speech component and a noise component (b) calculating a likelihood ratio for the presence of speech in the signal from the estimated power of noise signals from step (a) and a complex Gaussian statistical model (c) updating the noise power estimate based on the likelihood ratio calculated in step (b)

wherein the likelihood ratio is restricted using a non-linear function to a predetermined interval.

In the voice activity methods of the first and second aspects of the present invention the likelihood ratio that is calculated is compared to a pre-defined threshold value in order to determine the presence or absence of speech.

Conveniently in both aspects of the invention the noisy speech signal under analysis is transformed from the time domain to the frequency domain via a Fast Fourier Transform step.

In both the first and second aspects of the present invention the likelihood ratio (LR) of the $k^{th}$ spectral bin may be defined as $$\Lambda_k = \frac{P(X_k \mid H_{1,k})}{P(X_k \mid H_{0,k})} = \frac{1}{1+\xi_k}\exp\left\{\frac{\gamma_k \xi_k}{1+\xi_k}\right\}$$

where hypothesis $H_0$ represents the absence of speech; hypothesis $H_1$ represents the presence of speech; $\gamma_k$ and $\xi_k$, the a posteriori and a priori signal-to-noise ratios (SNR) respectively, defined as $$\gamma_k = \frac{|X_k|^2}{\lambda_{N,k}}$$

and $$\xi_k = \frac{\lambda_{S,k}}{\lambda_{N,k}};$$

and $\lambda_{N,k}$ and $\lambda_{S,k}$ are the noise and speech variances at frequency index k respectively Conveniently the likelihood ratio may be smoothed in the log domain using a first order recursive system in order to improve performance. In such cases the smoothed likelihood ratio may be calculated as $$\Psi_k(t)=\kappa\Psi_k(t-1)+(1-\kappa)\log \Lambda_k(t)$$

where κ is a smoothing factor and t is the time frame index.

The geometric mean of the smoothed likelihood ratio can conveniently be computed as $$\Psi(t) = \frac{1}{K}\sum_{k=0}^{K-1} \Psi_k(t)$$

and Ψ(t) is used to determine the presence of speech. [Note: Depending on the noise characteristics certain frequency bands can be eliminated from the above summation].

In a third aspect of the present invention which corresponds to the first aspect of the invention there is provided a voice activity detector comprising a likelihood ratio calculator for calculating a likelihood ratio for the presence of speech in a noisy signal using an estimate of the noise power in the noisy signal and a complex Gaussian statistical model wherein the noise power estimate is calculated independently of the VAD.

In a fourth aspect of the present invention which corresponds to the second aspect of the invention there is provided a voice activity detector comprising a likelihood ratio calculator for calculating a likelihood ratio for the presence of speech in a noisy signal using an estimate of the noise power in the noisy signal and a complex Gaussian statistical model wherein the likelihood ratio is used to update the noise estimate within the detector and wherein the likelihood ratio is restricted using a non-linear function to a predetermined interval.

In a further aspect of the present invention there is provided a voice activity detection system comprising a voice activity detector according to the third aspect of the present invention or a voice activity detector configured to implement the first aspect of the present invention and a noise estimator for providing a noise estimate to the voice activity detector for a signal including a noise component and a speech component.

The skilled person will recognise that the above-described equalisers and methods may be embodied as processor control code, for example on a carrier medium such as a disk, CD- or DVD-ROM, programmed memory such as read only memory (Firmware), or on a data carrier such as an optical or electrical signal carrier.

BRIEF DESCRIPTION OF THE DRAWINGS

These and other aspects of the invention will now be further described, by way of example only, with reference to the accompanying figures in which.

DETAILED DESCRIPTION OF THE INVENTION

Figure 1:
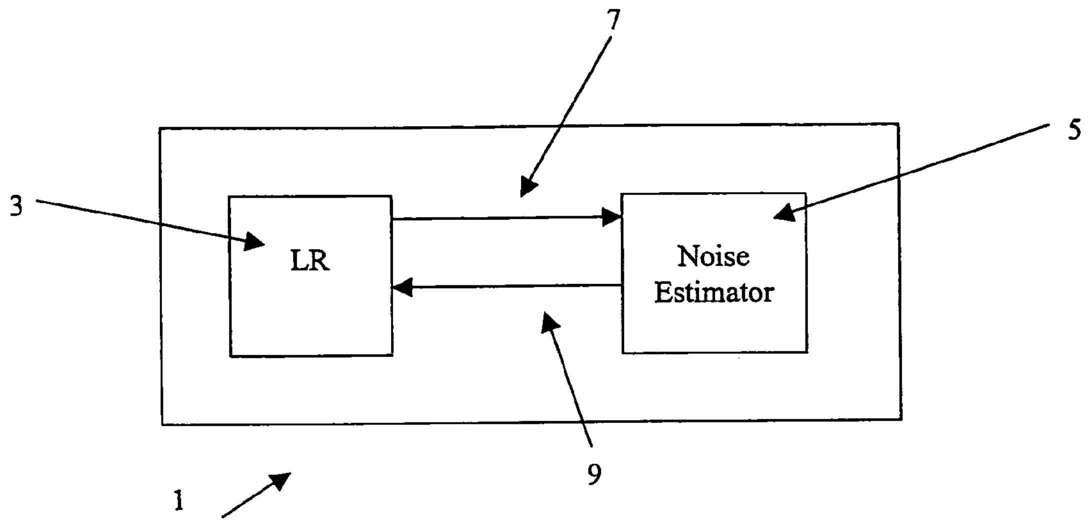
FIG. 1 shows a schematic illustration of a prior art voice activity detector

In the statistical model used in the present invention (and also described in Cho et al) a voice activity decision is made by testing two hypotheses, $H_0$ and $H_1$ where $H_0$ indicates the absence of speech and $H_1$ indicates the presence of speech.

The statistical model assumes that each spectral component of the speech and noise has a complex Gaussian distribution in which noise is additive and uncorrelated with the speech. Based on this assumption the conditional probability density functions (PDF) of a noisy spectral component $X_k$, given $H_{0,k}$ and $H_{1,k}$, are as follows:

$$P(X_k \mid H_{0,k}) = \frac{1}{\pi\lambda_{N,k}}\exp\left\{-\frac{|X_k|^2}{\lambda_{N,k}}\right\} \quad (1)$$

and $$P(X_k \mid H_{1,k}) = \frac{1}{\pi(\lambda_{N,k}+\lambda_{S,k})}\exp\left\{-\frac{|X_k|^2}{\lambda_{N,k}+\lambda_{S,k}}\right\} \quad (2)$$

where $\lambda_{N,k}$ and $\lambda_{S,k}$ are the noise and speech variances at frequency index k respectively.

The likelihood ratio (LR) of the $k^{th}$ spectral bin is then defined as $$\Lambda_k = \frac{P(X_k \mid H_{1,k})}{P(X_k \mid H_{0,k})} = \frac{1}{1+\xi_k}\exp\left\{\frac{\gamma_k \xi_k}{1+\xi_k}\right\} \quad (3)$$

where $\gamma_k$ and $\xi_k$, the a posteriori and a priori signal-to-noise ratios (SNR) respectively, are defined as $$\gamma_k = \frac{|X_k|^2}{\lambda_{N,k}} \quad (4)$$

and $$\xi_k = \frac{\lambda_{S,k}}{\lambda_{N,k}} \quad (5)$$

In the prior art the noise variance, $\lambda_{N,k}$ is derived through noise adaptation in which the variance of the noise spectrum of the kth spectral component in the $t^{th}$ frame is updated in a recursive way as $$\lambda_{N,k}^{(t)} = \eta\lambda_{N,k}^{(t-1)} + (1-\eta)E(|N_k^{(t)}|^2|X_k^{(t)}) \quad (6)$$

where $\eta$ is a smoothing factor. The expected noise power spectrum $E(|N_k^{(t)}|^2|X_k^{(t)})$ is estimated by means of a soft decision technique as $$E(|N_k^{(t)}|^2|X_k^{(t)}) = |X_k^{(t)}|^2 p(H_{0,k}|X_k^{(t)}) + \lambda_{N,k}^{(t-1)} p(H_{1,k}|X_k^{(t)}) \quad (7)$$

where $p(H_{1,k}|X_k^{(t)}) = 1 - p(H_{0,k}|X_k^{(t)})$ and $p(H_{1,k}|X_k^{(t)})$ is calculated as follows:

$$p(H_{0,k} \mid X_k^{(t)}) = \frac{1}{1 + \frac{p(H_{1,k})}{p(H_{0,k})}\Psi_k} \quad (8)$$

It is thus noted that the noise variance calculated in Equation (6) utilises (in Eq. 7) PDF values for the presence and absence of speech. The PDF calculations, in turn, indirectly use values for $\lambda_{N,k}$ (see Equation (2)).

The unknown a priori speech absence probability (which can also be upper and lower bounded by user predefined limits) can be written as follows $$p(H_{0,k}^{(t)}) = \beta p(H_{0,k}^{(t-1)}) + (1-\beta)p(H_{0,k}^{(t)}|X_k^{(t)}) \quad (9)$$

It is therefore clear that a feedback mechanism exists in the method described according to the prior art which can lead to an accumulation of errors.

The above discussion is represented schematically in FIG. 1 in which a Voice Activity Detector 1 according to the prior art comprises a Likelihood Ratio calculation component 3 and also a noise estimation component 5. The output 7 of the LR component feeds into the noise estimation component 5 and the output 9 of the noise estimation component feeds into the LR component.

Figure 2:
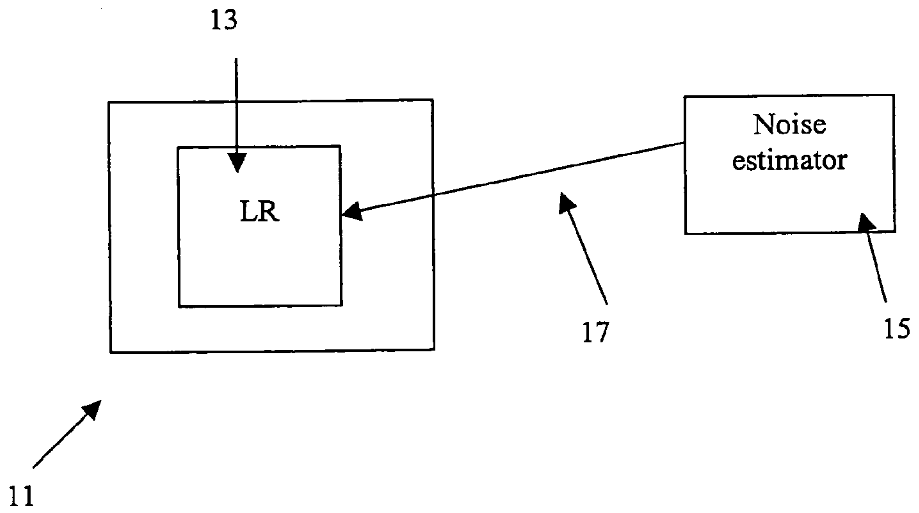
FIG. 2 shows a schematic illustration of a voice activity detector according to the present invention

The voice activity detection method of the first (and third) aspect (s) of the present invention is represented schematically in FIG. 2 in which a Voice Activity Detector 11 comprises a LR component 13. An independent noise estimation component 15 feeds noise estimates 17 into the LR component in order to derive the Likelihood ratio.

The voice activity detector according to the first and third aspects of the present invention estimates the noise variance $\lambda_{N,k}$ externally using a suitable technique. For example a quantile based noise estimation approach (as described in more detail below) may be used to estimate the noise variance.

The voice activity detector according to the second and fourth aspects of the present invention processes the likelihood ratio derived in a LR component using a non-linear function in order to restrict the values of the ratio to a predetermined interval.

The speech variance is then estimated in the present invention as $$\lambda_{S,k}^{(t)} = \beta_S\lambda_{S,k}^{(t-1)} + (1-\beta_S)\max(|X_k^{(t)}|^2 - \lambda_{N,k}^{(t)}, 0) \quad (10)$$

wherein $\beta_S$ is the speech variance forgetting factor.

The likelihood ratio can then be calculated as described with reference to Equations (1)-(5). Speech presence or absence is then calculated by comparing the LR to a threshold value.

It is noted that in all aspects of the present invention the performance of the voice activity detector may be improved by smoothing the likelihood ratio in the log domain using a first order recursive system wherein $$\Psi_k(t) = \kappa\Psi_k(t-1) + (1-\kappa)\log\Lambda_k(t) \quad (11)$$

where t is the time frame index and $\kappa$ is a smoothing factor. The geometric mean of the smoothed likelihood ratio (SLR) (equivalent to the arithmetic mean in the log domain) may then be calculated as $$\Psi(t) = \frac{1}{K}\sum_{k=0}^{K-1}\Psi_k(t) \quad (12)$$

$\Psi(t)$ can then be used to detect speech presence or absence as before by comparison with a threshold value.

The threshold value against which the LR and SLR are compared to determine the presence of speech is crucial to the behaviour and performance of the Voice Activity Detector. The value chosen for the parameter (for example by simulation experiments) should be robust to changes in the input speech dynamic range and/or the noise conditions. Usually, this parameter has to be adjusted whenever the SNR values change.

However, as noted above the LR/SLR may vary across many dBs and it can therefore be difficult to set the parameter at a suitable value.

In order to mitigate against changes in the SNR the LR/SLR calculated in the first and third aspects of the present invention may be further processed by a non-linear function in order to restrict the values for the likelihood ratio to a particular interval, e.g. between zero (0) and one (1). By compressing the likelihood ratio in this way the effects of noise variances can be reduced and system performance increased. It is noted that this restrictive function corresponds to the second aspect of the present invention but may also be used in conjunction with the first aspect of the present invention.

An example of a function suitable for restricting the likelihood ratio value to the [0,1] interval is $$\overline{\Psi}(t) = 1 - \min(1, e^{-\Psi(t)}) \quad (13)$$

In the first aspect of the present invention the noise estimate is derived externally to the likelihood ratio calculation. One method of deriving such an estimate is by a quantile based noise estimation (QBNE) approach.

A QNBE approach estimates the noise power spectrum continuously (i.e. even during periods of speech activity) by utilising the assumption that the speech signal is not stationary and will not occupy the same frequency band permanently. The noise signal on the other hand is assumed to be slowly varying compared to the speech signal such that it can be considered relatively constant for several consecutive analysis frames (time periods).

Working under the above assumptions it is possible to sort the noisy signal (in order to build sorted buffers) for each frequency band under consideration over a period of time and to retrieve a noise estimate from the so constructed buffers.

Figure 3:
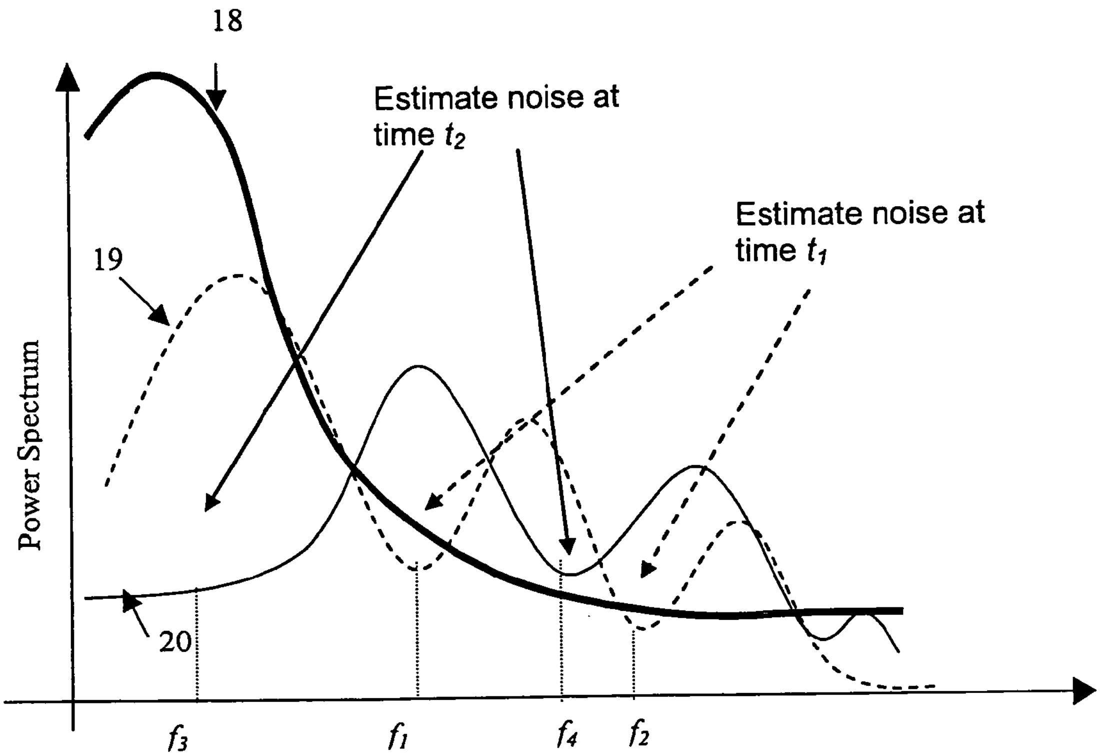
FIG. 3 shows a plot of signal power versus frequency for a noisy speech signal
Figure 4:
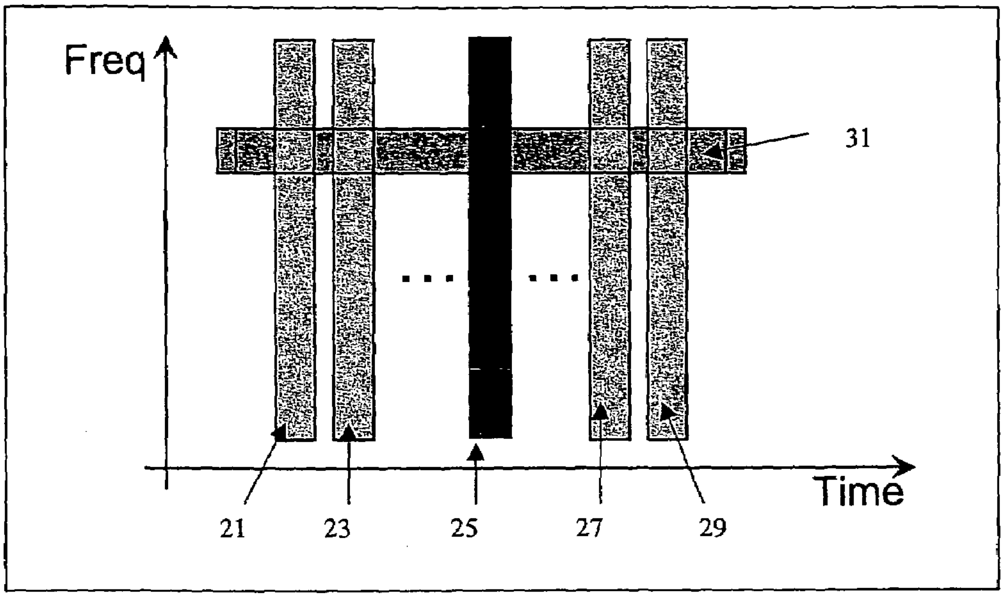
FIG. 4 shows a frequency versus time plot for a signal over T time frames
Figure 5:
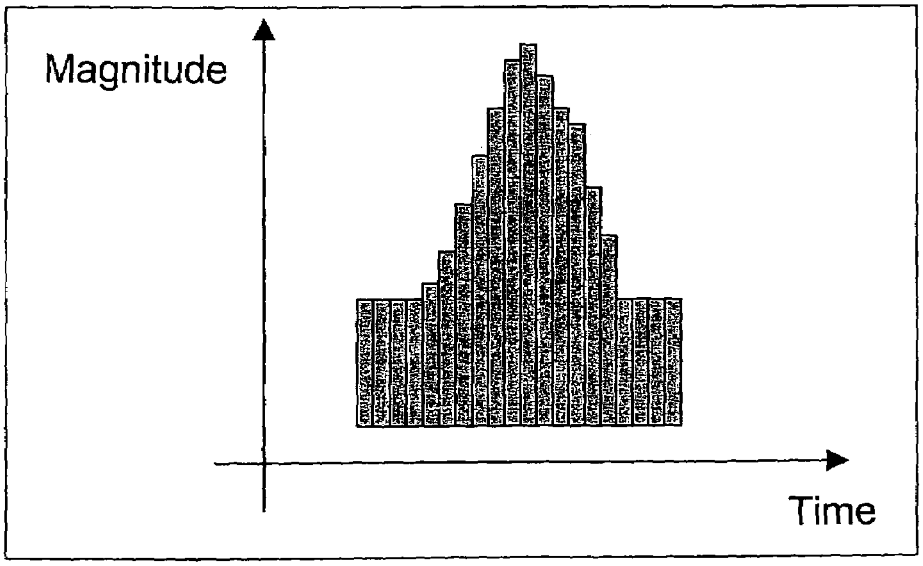
FIG. 5 shows power spectrum values of a particular frequency bin versus time

The QBNE approach is illustrated in FIGS. 3 to 5.

FIG. 3 shows a plot of signal power (power spectrum) versus frequency for a noise signal 18 and a speech signal at two different times, $t_1$ and $t_2$ (in the Figure the speech signal at time $t_1$ is labelled 19 and at time $t_2$ it is labelled 20). It can be seen that the speech signal does not occupy the same frequencies at each time and so the noise, at a particular frequency, can be estimated when speech does not occupy that particular frequency band. In the Figure, for example, the noise at frequencies $f_1$ and $f_2$ can be estimated at time $t_1$ and the noise at frequencies $f_3$ and $f_4$ can be estimated at time $t_2$.

For a noisy signal, X(k,t) is the power spectrum of the noisy signal where k is the frequency bin index and t is the time (frame) index. If the past and the future T/2 frames are stored in a buffer then for frame t, these T frames X(k,t) can be sorted at each frequency bin in an ascending order such that $$X(k,t_0) \leqq X(k,t_1) \leqq \ldots \leqq X(k,t_{T-1}) \tag{14}$$

where $t_j \in [t-T/2, t+T/2-1]$.

The above equation is illustrated in FIGS. 4 and 5. Turning to FIG. 4 a frequency versus time plot is shown for a number of time frames (for the sake of clarity only 5 of the total T frames are shown). Depending on the particular application thirty time frames may be stored in the buffer, i.e. T=30). At each frame the power spectrum of the signal is a vector represented by the vertical boxes (21,23,25,27,29).

For a particular frequency, k, (illustrated by the horizontal box 31 in FIG. 4) the power spectrum values over a window of T frames may be stored in a FIFO buffer as illustrated in FIG. 5. The stored frames can then be sorted in ascending order (as described in relation to Equation 14 above) using any fast sorting technique.

The noise estimate, Ñ(k,t), for the kth frequency may be taken as the qth quantile of the values sorted in the buffer. In other words, $$\tilde{N}(k,t) = X(k,t_{\lfloor qT \rfloor}) \tag{15}$$

where 0<q<1 and ⌊ ⌋ denotes rounding down to the nearest integer.

The noise estimate may be worked out for each frequency band.

In calculating a noise estimate it is assumed that, for T frames, one particular frequency will be occupied by a speech component for at most 50% of the time. Therefore, if q is set equal to 0.5 then the median value will be selected as the noise estimate. It is thought that the median quantile value will give better performance than other quantile values as it is less vulnerable to outlying variations.

The QBNE derived noise estimate can be improved by smoothing the value obtained from Equation 15 above using a first order recursive function, wherein $$\hat{N}(k,t) = \rho(k,t)\hat{N}(k,t-1) + (1-\rho(k,t))\tilde{N}(k,t) \tag{16}$$

where Ñ is the noise estimate derived in Equation 15 above, N̂ is the smoothed noise estimate and ρ(k,t) is a frequency dependent smoothing parameter which is updated at every frame t according to the signal-to-noise ratio (SNR).

The instantaneous SNR may be defined as the ratio between the input noisy speech spectrum and the current QBNE noise estimate, i.e.

$$\gamma(k,t) = \frac{X(k,t)}{\tilde{N}(k,t)} \tag{17}$$

Alternatively, the noise estimate from the previous frame may also be used such that $$\gamma(k,t) = \frac{X(k,t)}{\hat{N}(k,t-1)} \tag{18}$$

In either case the smoothing parameter may be obtained as $$\rho(k,t) = \frac{\gamma(k,t)}{\gamma(k,t)+\mu} \tag{19}$$

Where μ is a parameter that controls the sensitivity to the QBNE estimate.

It is noted that as the SNR increases it should be arranged that the QBNE noise estimate for a particular frequency should have little effect on an updated noise estimate. On the other hand, if the SNR is low, i.e. noise dominates a given frame at a given frequency, then the QBNE estimate from one frame to the next will become more reliable and consequently a current noise estimate should have a larger effect on an updated estimate. The parameter μ controls the sensitivity to the QBNE estimate. If μ→0 then ρ(k,t)→1 and Ñ(k,t) will have little effect on the noise estimate. If μ→∞, on the other hand, then Ñ(k,t) will dominate the estimate at each frame.

It is noted that conventional speech analysis systems often analyse input signals in more than one hundred frequency bands. If the neighbouring 30 frames are also stored and analysed in order to derive the noise estimate then it may become computationally prohibitively expensive to maintain and update a noise estimate at every frequency for every frame.

The noise estimate may therefore only be updated over a sub-set of the total frequency bands under analysis. For example, if there are 10 frequency bands then for a first frame t the noise estimate may only be calculated and updated for the odd frequency bands (1,3,5,7,9). During the next frame t', the noise estimate may be calculated and updated for the even frequency bands (2,4,6,8,10).

For frame t, the noise estimate on the even frequency bands may be estimated by interpolation from the odd frequency values. For frame t', the noise estimate on the odd frequency bands may be estimated by interpolation from the even frequency values.

A voice activity detector according to aspects of the present invention was evaluated against a conventional detector for both German and UK English speech utterances. The VAD was used to detect the start and end points of the utterances for speech recognition purposes.

In a first experiment car noise was artificially added to a first data set at different signal-to-noise ratios. Speech signals were padded with silent periods at the start and end of the utterances.

Figure 6:
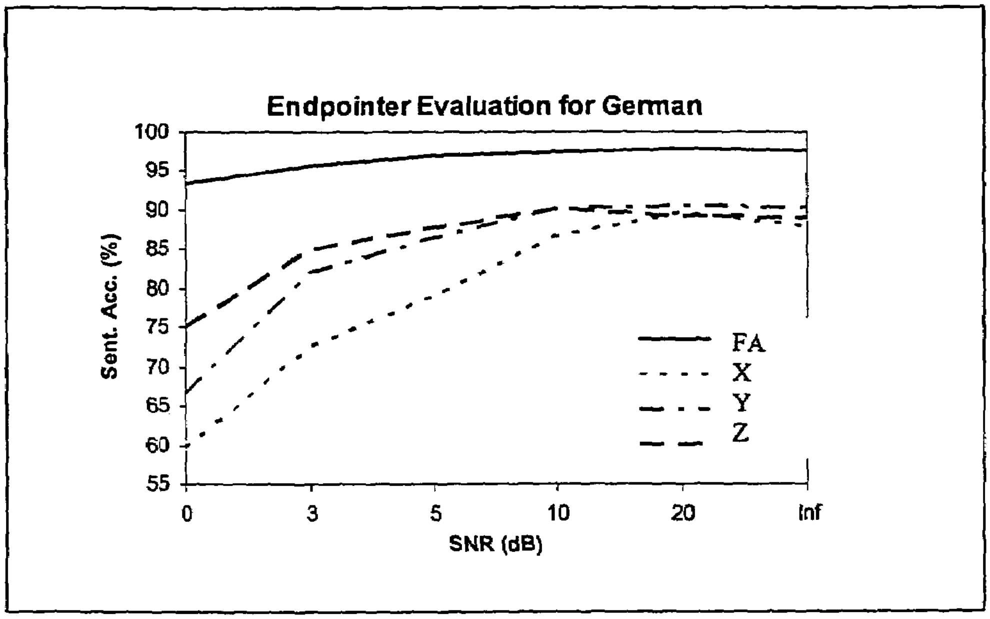
FIG. 6 shows accuracy of speech recognition versus signal-to-noise values for a signal comprising German speech

FIG. 6 shows the speech recognition accuracy results of the first experiment for the German data set. The solid line, marked "FA", represents recognition results corresponding with accurate endpoints obtained via forced alignment.

Line X in FIG. 6 shows results using a prior art voice activity detector (internal noise estimation and no compression of likelihood ratio), line Y shows results for a voice activity detector which calculates a likelihood ratio which is then smoothed and compressed as detailed above (i.e. a voice activity detector according to the second and fourth aspects of the present invention) and Line Z shows the results for a voice activity detector which utilises an independent noise estimator (i.e. a voice activity detector according to the first and third aspects of the present invention).

It can be seen that the voice activity detectors according to aspects of the present invention outperform the prior art detector, especially at low SNR levels.

Furthermore, it can also be seen that the use of an external noise estimate (line Z) further enhances the performance of the voice activity detector when compared to the version which smoothes and compresses the likelihood ratio (line Y).

Figure 7:
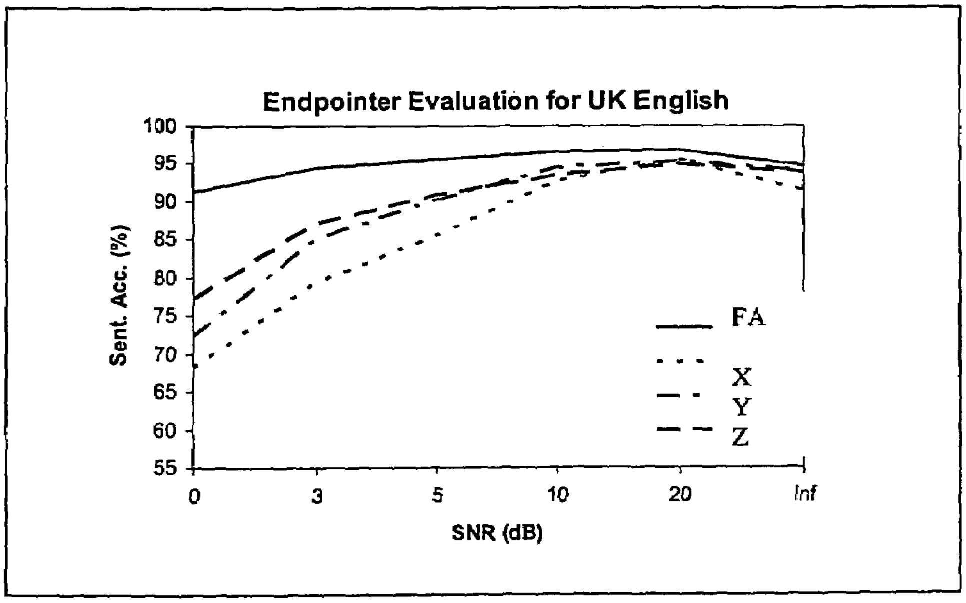
FIG. 7 shows accuracy of speech recognition versus signal-to-noise values for a signal comprising UK English speech.

FIG. 7 shows the results of a similar evaluation this time performed with an English language data set. As for the German utterance the results according to aspects of the present invention are an improvement over the prior art system.

A further performance evaluation is shown in Table 1 below for two further data sets, C and D. which were recorded in a second experiment conducted in a car.

Once again evaluation has been performed for both UK English and German and it can be seen that a voice activity detector according to the present invention which uses an independent noise estimation outperforms the prior art system. For German utterances the recognition error rate is reduced by around 30% and for UK English the reduction is around 25%.

TABLE 1

| Voice activity detector | German DATA SET C | German DATA SET D | UK English C | UK English D |
|---|---|---|---|---|
| COMPARISON | 94.1 | 92.7 | 92.4 | 88.3 |
| PRIOR ART | 86.1 | 80.4 | 83.6 | 78.5 |
| VAD WITH COMPRESSION OF LR | 90.3 | 82.4 | 88.7 | 83.4 |
| VAD WITH EXTERNAL NOISE ESTIMATION | 90.5 | 85.9 | 87.7 | 84.0 |

The invention claimed is:

1. A voice activity detection method comprising the steps of:

(a) Estimating in a noise power estimator a noise power within a signal having a speech component and a noise component; and (b) Calculating a likelihood ratio for a presence of speech in the signal from the estimated power of noise signals from step (a) and from a complex Gaussian statistical model, wherein the estimated power of the noise signals is calculated independently of the likelihood ratio.

2. A voice activity detection method as claimed in claim 1 wherein the likelihood ratio in step (b) is restricted using a non-linear function to a predetermined interval.

3. A voice activity detection method as claimed in claim 2 wherein the likelihood ratio is restricted by the function $$\overline{\Psi}(t)=1-\min(1,e^{-\Psi(t)})$$

where $\Psi(t)$ is the likelihood ratio.

4. A voice activity detection method as claimed in claim 1, wherein the noise power estimator uses a quantile based estimation method to estimate the noise power.

5. A voice activity detection method as claimed in claim 4, wherein the noise power estimate is smoothed using a first order recursive function.

6. A voice activity detection method as claimed in claim 1, wherein the signal is analysed over K+1 frequency bands and for each time frame the noise power estimate is only updated over a sub-set of the K+1 frequency bands.

7. A voice activity detection method as claimed in claim 6, wherein the noise estimate is updated over all K+1 frequency bands by interpolation from the sub-set of updated frequency bands.

8. A voice activity detection method as claimed in claim 1, wherein the likelihood ratio is compared to a threshold value in order to detect the presence or absence of speech.

9. A voice activity detection method as claimed in claim 1, wherein the likelihood ratio is determined by the following equation $$\Lambda_k=\frac{P(X_k\mid H_{1,k})}{P(X_k\mid H_{0,k})}=\frac{1}{1+\xi_k}\exp\left\{\frac{\gamma_k\xi_k}{1+\xi_k}\right\}$$

wherein hypothesis $H_0$ represents the absence of speech; hypothesis $H_1$ represents the presence of speech; $\lambda_{N,k}$ and $\lambda_{S,k}$ are the noise and speech variances at frequency index k respectively; and $\gamma_k$ and $\xi_k$, are defined as $$\gamma_k=\frac{|X_k|^2}{\lambda_{N,k}}\text{ and }\xi_k=\frac{\lambda_{S,k}}{\lambda_{N,k}}.$$

10. A voice activity detection method as claimed in claim 9, wherein a smoothed likelihood ratio is calculated by the following equation $$\Psi_k(t)=\kappa\Psi_k(t-1)+(1-\kappa)\log\Lambda_k(t)$$

where $\kappa$ is a smoothing factor and t is the time frame index.

11. A voice activity detection method as claimed in claim 10, wherein the geometric mean of the smoothed likelihood ratio is calculated as $$\Psi(t)=\frac{1}{K}\sum_{k=0}^{K-1}\Psi_k(t)$$

and $\Psi(t)$ is used to determine the presence of speech.

12. A voice activity detection system comprising a voice activity detector configured to implement the method of claim 1, and a noise estimator for providing a noise estimate to the voice activity detector for a signal including a noise component and a speech component.

13. A voice activity detection method comprising the steps of:

(a) estimating a noise power within a signal having a speech component and a noise component;

(b) calculating a likelihood ratio for a presence of speech in the signal from the estimated power of noise signals from step (a) and a complex Gaussian statistical model; and (c) updating the noise power estimate based on the likelihood ratio calculated in step (b)

wherein the likelihood ratio is restricted using a non-linear function to a predetermined interval.

14. A voice activity detector comprising: a noise power estimator for estimating a noise power within a noisy signal; and a likelihood ratio calculator for calculating a likelihood ratio for a presence of speech in the noisy signal using the estimated noise power of the noisy signal; and using a complex Gaussian statistical model, wherein the estimated noise power is calculated independently of the likelihood ratio.

15. A voice activity detection system comprising a voice activity detector according to claim 14 and a noise estimator for providing a noise estimate to the voice activity detector for a signal including a noise component and a speech component.

16. A voice activity detector comprising:

a likelihood ratio calculator for calculating a likelihood ratio for a presence of speech in a noisy signal using an estimate of a noise power in the noisy signal and using a complex Gaussian statistical model, wherein the likelihood ratio is used to update the estimate of the noise power within the detector and the likelihood ratio is restricted using a non-linear function to a predetermined interval.

* * * * *

UNITED STATES PATENT AND TRADEMARK OFFICE

CERTIFICATE OF CORRECTION

PATENT NO. : 7,596,496 B2 
APPLICATION NO. : 11/429308
DATED : September 29, 2009
INVENTOR(S) : Jabloun It is certified that error appears in the above-identified patent and that said Letters Patent is hereby corrected as shown below:

On the title page, Item (73), the Assignee should read:

-- (73) Assignee: Kabushiki Kaisha Toshiba, Tokyo (JP) --

Signed and Sealed this

Tenth Day of November, 2009

David J. Kappos
*Director of the United States Patent and Trademark Office*